(12) United States Patent
Luo et al.

(10) Patent No.: US 10,965,140 B2
(45) Date of Patent: *Mar. 30, 2021

(54) BATTERY CHARGING CIRCUIT WITH IMPROVED SYSTEM STABILITY AND CONTROL METHOD THEREOF

(71) Applicant: Hangzhou MPS Semiconductor Technology Ltd., Hangzhou (CN)

(72) Inventors: Suhua Luo, Hangzhou (CN); Pengpeng Ma, Hangzhou (CN)

(73) Assignee: Hangzhou MPS Semiconductor Technology Ltd., Hangzhou (CN)

( * ) Notice: Subject to any disclaimer, the term of this patent is extended or adjusted under 35 U.S.C. 154(b) by 102 days.

This patent is subject to a terminal disclaimer.

(21) Appl. No.: 16/440,936

(22) Filed: Jun. 13, 2019

(65) Prior Publication Data

US 2020/0006953 A1 Jan. 2, 2020

(30) Foreign Application Priority Data

Jun. 28, 2018 (CN) .......................... 201810692507.6

(51) Int. Cl.
*H02J 7/06* (2006.01)
*H02J 7/24* (2006.01)
*H02J 7/00* (2006.01)

(52) U.S. Cl.
CPC .................... *H02J 7/008* (2013.01)

(58) Field of Classification Search
CPC ..................................................... H02J 7/008
USPC ....................................................... 320/163
See application file for complete search history.

(56) References Cited

U.S. PATENT DOCUMENTS

| 6,100,664 | A | * | 8/2000 | Oglesbee | H02J 7/02 320/125 |
| 7,474,079 | B2 | * | 1/2009 | Hashimoto | H02J 7/02 320/138 |
| 8,085,001 | B2 | * | 12/2011 | Wang | H02J 7/0031 320/164 |
| 9,431,845 | B2 | * | 8/2016 | Xu | H02J 7/0072 |
| 10,063,078 | B2 | | 8/2018 | Xu et al. | |
| 10,110,037 | B2 | | 10/2018 | Ouyang | |
| 10,116,155 | B2 | | 10/2018 | Xu et al. | |
| 2016/0226264 | A1 | | 8/2016 | Xu et al. | |
| 2019/0207392 | A1 | * | 7/2019 | Luo | H02J 7/007 |

* cited by examiner

*Primary Examiner* — Yalkew Fantu
(74) *Attorney, Agent, or Firm* — Perkins Coie LLP

(57) ABSTRACT

A control method for controlling a battery charging circuit having at least one switch, includes: generating a first difference signal based on the difference between a charging current feedback signal and a charging current reference signal; generating a bias reference signal by proportionally integrating the first difference signal when the battery voltage is higher than a first threshold and less than a second threshold; generating a bias signal by proportionally integrating the difference between the sum of the bias reference signal and a system voltage reference signal and a system voltage feedback signal; generating a comparison signal by comparing the sum of the system voltage feedback signal and a ramp signal with the sum of the bias signal and the system voltage reference signal; and generating a control signal for controlling the at least one switch based on the comparison signal and a constant time period control signal.

18 Claims, 10 Drawing Sheets

BATTERY CHARGING CIRCUIT WITH
IMPROVED SYSTEM STABILITY AND
CONTROL METHOD THEREOF

CROSS-REFERENCE TO RELATED
APPLICATIONS

This application claims the benefit of CN application 201810692507.6, filed on Jun. 28, 2018, and incorporated herein by reference.

TECHNICAL FIELD

The present invention relates generally to electrical circuits, and more particularly but not exclusively to battery charging circuits.

BACKGROUND

With development of the electronic technology, a computing system is widely used. From handheld electronic devices such as, for example, tablet personal computer, e-book, digital camera, to large electronic devices such as, for example, server, computing base station, all require the computing system. A computing platform comprises a central processing unit (CPU) and other components. The CPU is utilized to interpret machine readable instructions and process all data in the computing system. A voltage regulator is needed to power the CPU. In addition, a battery is utilized to provide power to the voltage regulator when the computing platform disconnects from an external power supply. Thus, a battery charging circuit is absolutely needed to provide a system voltage to the voltage regulator and charge the battery when the computing platform connects to the external power supply, for the purpose of controlling the charging process.

Because of the diversified power supply and batteries, multiple variables, e.g., a system voltage for a system load, a charging current to the battery and a battery voltage and so on should be involved in the control of the charging process. However, the unsmooth switching among the multiple control loops of multiple variables will lead to the problem of system instability. Thus, the battery charging circuit should be designed to satisfy demands of system stability.

SUMMARY

Embodiments of the present invention are directed to a battery charging circuit having a switching circuit, a bias reference circuit, a bias generator, a comparison circuit, a constant time period control circuit and a logic circuit. The switching circuit has at least one switch and an inductor coupled to the at least one switch. The bias reference circuit has a first input terminal configured to receive a charging current feedback signal and a second input terminal configured to receive a charging current reference signal, wherein the bias reference circuit proportionally integrates a difference between the charging current feedback signal and the charging current reference signal and provides a bias reference signal at an output terminal when a battery voltage is higher than a first threshold and less than a second threshold, wherein the first threshold is less than the second threshold. The bias generator is coupled to the output terminal of the bias reference circuit to receive the bias reference signal, wherein the bias generator proportionally integrates a difference between the sum of the bias reference signal and a system voltage reference signal and a system voltage feedback signal, and provides a bias signal at an output terminal. The comparison circuit has a first input terminal, a second input terminal and an output terminal, wherein the first input terminal is configured to receive the sum of the bias signal and the system voltage reference signal, and the second input terminal is configured to receive the sum of the system voltage feedback signal and a ramp signal, the comparison circuit provides a comparison signal at the output terminal. The constant time period control circuit is configured to provide a constant time period control signal. The logic circuit is configured to receive the comparison signal and the constant time period control signal, wherein the logic circuit provides a control signal at an output terminal to control the at least one switch.

BRIEF DESCRIPTION OF THE DRAWING

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
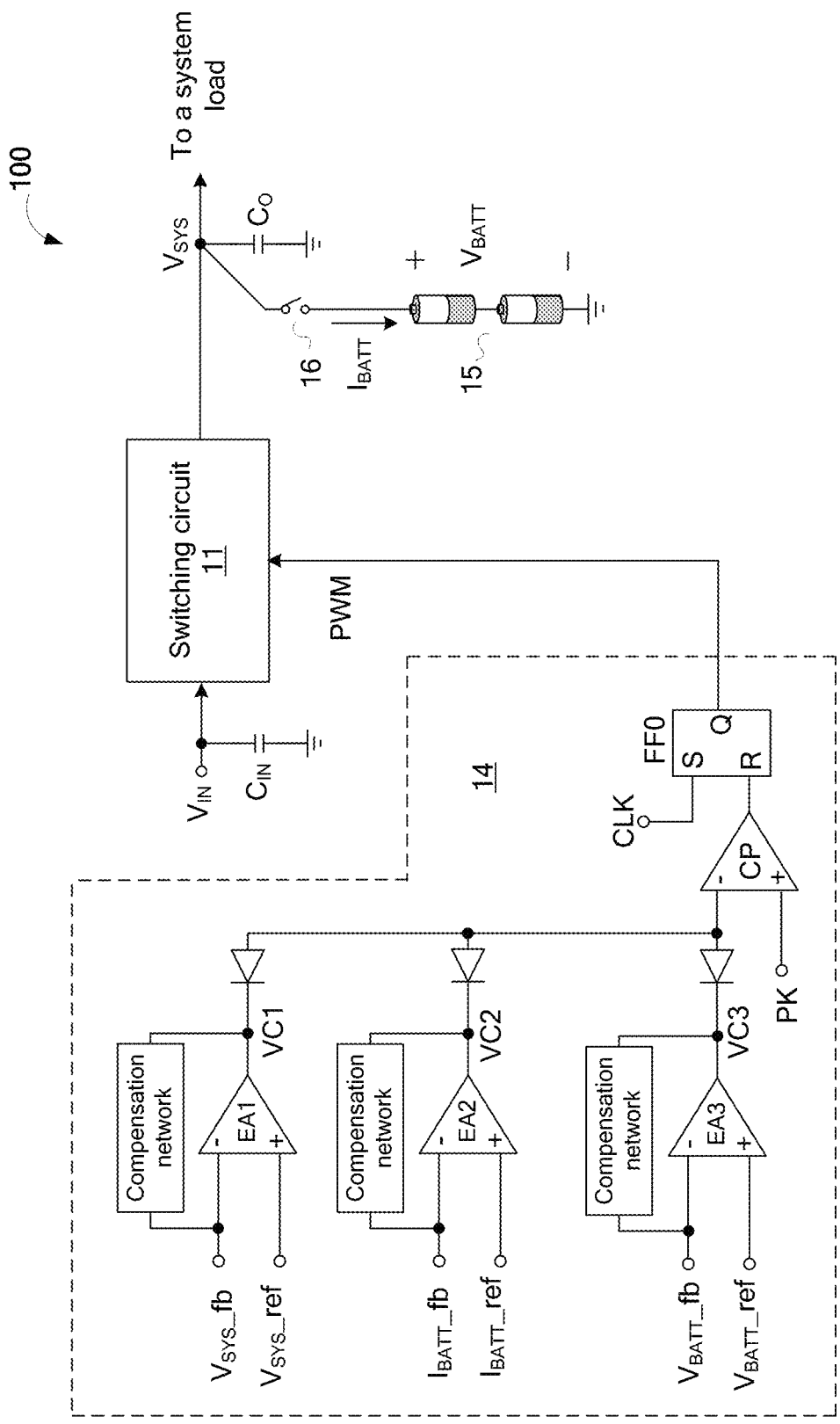
FIG. 1 shows a schematic diagram of a prior electronic device 100.

FIG. 1 shows a schematic diagram of a prior electronic device 100. The electronic device 100 comprises a battery charging circuit having a switching circuit 11, a switch 16 and a control circuit 14. The switching circuit 11 comprises at least one switch. The battery charging circuit and/or a battery 15 provide a system voltage $V_{SYS}$ to a system load. The switching circuit 11 has an input terminal configured to receive an input voltage $V_{IN}$ and an output terminal configured to provide the system voltage $V_{SYS}$. When the switching circuit 11 is disconnected from an external power supply, the input voltage $V_{IN}$ is equal to 0, the battery 15 provides the system voltage $V_{SYS}$ via the switch 16. When the switching circuit 11 is connected to the external power supply, for example, an external AC power supply or an external DC power supply is connected to the switching circuit 11 through an appropriate adapter, the external power supply provides the system voltage $V_{SYS}$ via the switching circuit 11, and provides a charging current $I_{BATT}$ to charge the battery 15 via the switch 16.

Figure 2:
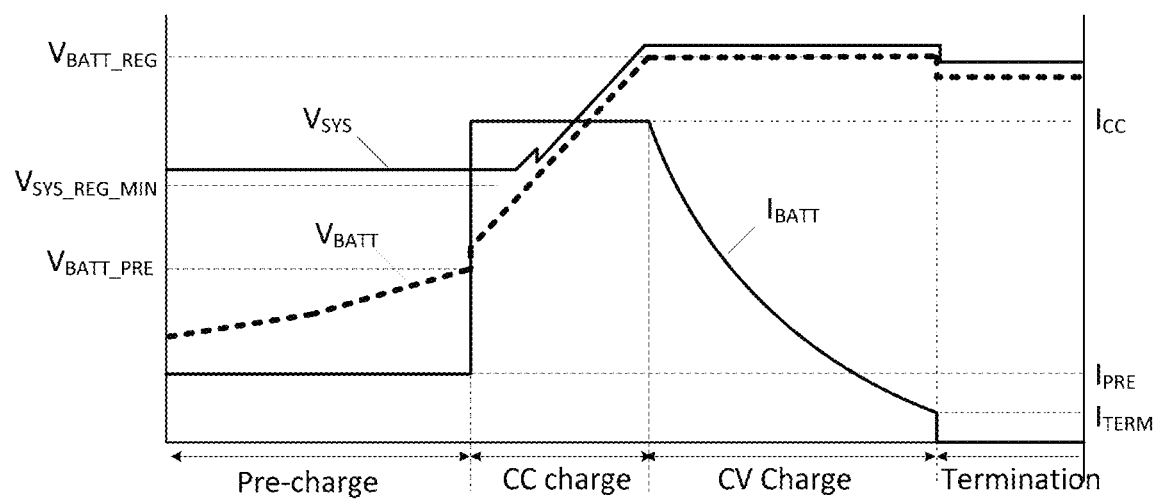
FIG. 2 shows current and voltage waveforms during charging process of a battery.

FIG. 2 shows current and voltage waveforms during charging process of a battery. As shown in FIG. 2, based on a battery voltage $V_{BATT}$, the charging process can be split into four stages. A first stage is pre-charge stage, the battery is pre-charged at a small current $I_{PRE}$ and the system voltage $V_{SYS}$ is maintained at a system voltage minimum value $V_{SYS\_REG\_MIN}$ during the pre-charge stage. The first stage ends and a second stage starts when the battery voltage $V_{BATT}$ increases to a first threshold $V_{BATT\_PRE}$. The second stage is CC (constant current) charge. The battery is charged quickly with a constant charging current $I_{BATT}$ that equals to a current reference $I_{CC}$ during the CC charge stage. The second stage ends and a third stage starts when the battery voltage $V_{BATT}$ increases to a second threshold $V_{BATT\_REG}$. The third stage is CV (constant voltage) charge stage. The charging current $I_{BATT}$ is decreased gradually and the battery voltage $V_{BATT}$ is kept at the second threshold $V_{BATT\_REG}$ during the CV charge stage. The fourth stage begins when the charging current $I_{BATT}$ is decreased to reach the current threshold $I_{TERM}$. The fourth stage is charge termination, the battery is nearly full, and the charging process is complete.

Referring still to FIG. 1, the control circuit 14 comprises three control loops for three variables including the system voltage $V_{SYS}$, the battery voltage $V_{BATT}$ and the charging current $I_{BATT}$. During the charging for the battery 15, the control circuit 14 is configured to provide a control signal PWM by switching the three control loops and to regulate the battery charging circuit output signals to the desired values, the battery charging circuit output signals includes the system voltage $V_{SYS}$, the charging current $I_{BATT}$ and/or the battery voltage $V_{BATT}$. Since each of the three control loops needs a corresponding error amplifier and needs a corresponding compensation network to stabilize the whole control circuit 14, as a result, the control circuit 14 is complicated and inefficiency. Meantime, the unsmooth switching among the three control loops may lead to system instability.

Figure 3:
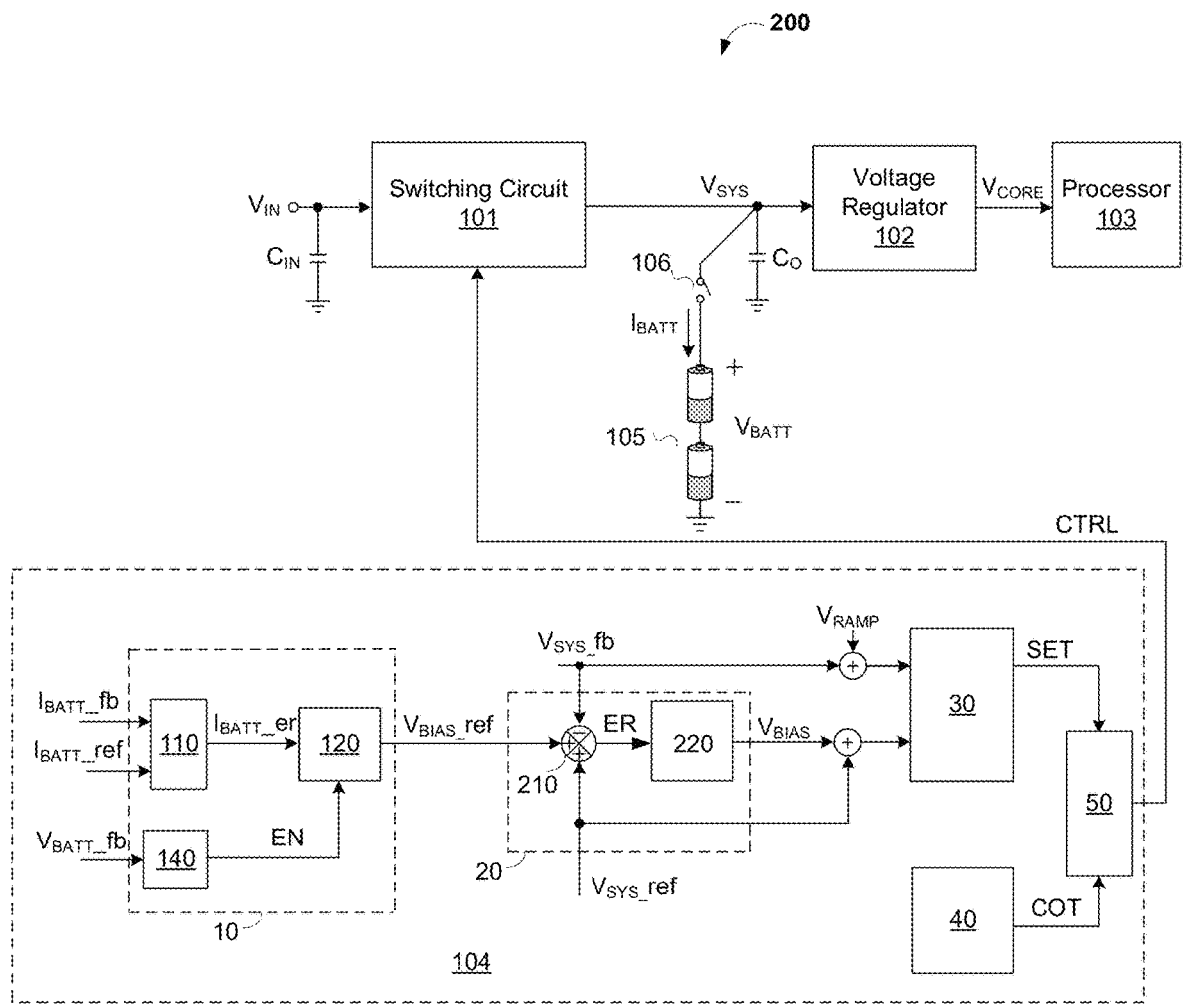
FIG. 3 shows a schematic diagram of an electronic device 200 in accordance with an embodiment of the present invention.

FIG. 3 shows a schematic diagram of an electronic device 200 in accordance with an embodiment of the present invention. The electronic device 200 comprises a battery charging circuit, a voltage regulator (VR) 102 and a processor 103. The battery charging circuit comprises a switching circuit 101 having at least one switch, a first switch 106, and a control circuit 104. The processor 103 may be a CPU, a graphics processing unit (GPU) or an application specific integrated circuit (ASIC). In one embodiment, the electronic device 200 is part of a computing platform. The battery charging circuit, the battery 105, and the voltage regulator 102 provides power to the computing platform. The battery charging circuit and/or the battery 105 provides a system voltage $V_{SYS}$ to the computing platform. The voltage regulator 102 converts the system voltage $V_{SYS}$ to a processor voltage $V_{CORE}$ to the processor 103. In one embodiment, the battery charging circuit comprises a narrow voltage direct current (NVDC) battery charging circuit. The switching circuit 101 has an input terminal configured to receive an input voltage $V_{IN}$ and an output terminal configured to provide the system voltage $V_{SYS}$. When the switching circuit 101 connects to an external power supply, the system voltage $V_{SYS}$ is provided by the switching circuit 101, and the battery 105 is charged by the switching circuit 101 through the first switch 106 with a charging current $I_{BATT}$.

In the embodiment of FIG. 3, the control circuit 104 comprises a bias reference circuit 10, a bias generator 20, a comparison circuit 30, a constant time period control circuit 40 and a logic circuit 50. The bias reference circuit 10 has a first input terminal, a second input terminal and an output terminal, wherein the first input terminal is configured to receive a charging current feedback signal $I_{BATT}$_fb, the second input terminal is configured to receive a charging current reference signal $I_{BATT}$_ref. The bias reference circuit 10, during the CC charge stage of FIG. 2, i.e. when the battery voltage $V_{BATT}$ is higher than the first threshold $V_{BATT\_PRE}$ and less than the second threshold $V_{BATT\_REG}$, is configured to proportionally integrate a difference between the charging current feedback signal $I_{BATT}$_fb and the charging current reference signal $I_{BATT}$_ref and provides a bias reference signal $V_{BIAS}$_ref at the output terminal. The bias generator 20 has an input terminal and an output terminal, wherein the input terminal is coupled to the output terminal of the bias reference circuit 10 to receive the bias reference signal $V_{BIAS}$_ref. The bias generator 20 is configured to proportionally integrate a difference between the sum of the bias reference signal $V_{BIAS}$_ref and a system voltage reference signal $V_{SYS}$_ref and a system voltage feedback signal $V_{SYS}$_fb, and provides a bias signal $V_{BIAS}$ at an output terminal. In one embodiment, the difference between the sum of the bias reference signal $V_{BIAS}$_ref and a system voltage reference signal $V_{SYS}$_ref and a system voltage feedback signal $V_{SYS}$_fb is labeled as an error signal ER.

The comparison circuit 30 has a first input terminal, a second input terminal and an output terminal, wherein the first input terminal is configured to receive the sum of the bias signal $V_{BIAS}$ and the system voltage reference signal $V_{SYS}$_ref, the second input terminal is configured to receive the sum of the system voltage feedback signal $V_{SYS}$_fb and a ramp signal $V_{RAMP}$, the comparison circuit 30 provides a comparison signal SET at the output terminal.

The constant time period control circuit 40 is configured to provide a constant time period control signal COT. In one embodiment, the constant time period control circuit 40 comprises a constant ON-time control circuit. In detail, during each of switching cycles, the constant time period control signal COT has a pulse, which is used to trig the OFF state of the at least one switch after a preset constant ON-time period. The constant ON-time control circuit is well known to persons of ordinary skill in the art, and will not be discussed here for brevity. The logic circuit 50 receives the comparison signal SET and the constant time period control signal COT, and provides a control signal CTRL to control the at least one switch of the switching circuit 101.

In the embodiment of FIG. 3, the bias reference circuit 10 comprises a first difference circuit 110, a proportional integrating circuit 120 and a mode control circuit 140. The first difference circuit 110 is configured to receive the charging current feedback signal $I_{BATT}$_fb and the charging current reference signal $I_{BATT}$_ref, and provides a first difference signal $I_{BATT}$_er. In one embodiment, the charging current reference signal $I_{BATT}$_ref is equal to the current reference signal $I_{CC}$. In another embodiment, the charging current reference signal $I_{BATT}$_ref is related to the current reference $I_{CC}$. In one embodiment, when the battery voltage $V_{BATT}$ is less than the first threshold $V_{BATT\_PRE}$, which represents the battery charging circuit is at the pre-charge stage, the mode control circuit 140 provides an enable signal EN having a first level at an output terminal to disable the proportional integrating circuit 120, and the bias reference signal $V_{BIAS}$_ref provided to the bias generator 20 is zero. When the battery voltage $V_{BATT}$ is less than the second threshold $V_{BATT\_REG}$ and higher than the first threshold $V_{BATT\_PRE}$, which represents the battery charging circuit is at the CC charge stage, the mode control circuit 140 provides the enable signal EN having a second level at the output terminal to enable the proportional integrating circuit 120, and the proportional integrating circuit 120 is configured to proportionally integrate the first difference signal $I_{BATT}$_er and provides the bias reference signal $V_{BIAS}$_ref at the output terminal during the CC charge stage.

In accordance with this present invention, during the pre-charge stage, the proportional integrating circuit 120 is disabled, the bias generator 20 independently modulate the control signal CTRL to the switching circuit 101, regulating the system voltage $V_{SYS}$ to maintain at the system voltage minimum value $V_{SYS\_REG\_MIN}$. During the CC charge stage, the bias reference circuit 10 is configured to provide the bias reference signal $V_{BIAS}$_ref based on the first difference signal $I_{BATT}$_er, and the bias generator 20 is configured to provide the bias signal $V_{BIAS}$ based on the bias reference signal $V_{BIAS}$_ref to modulate the control signal CTRL to the switching circuit 101, regulating the charging current $I_{BATT}$ to maintain at the current reference $I_{CC}$.

Figure 4:
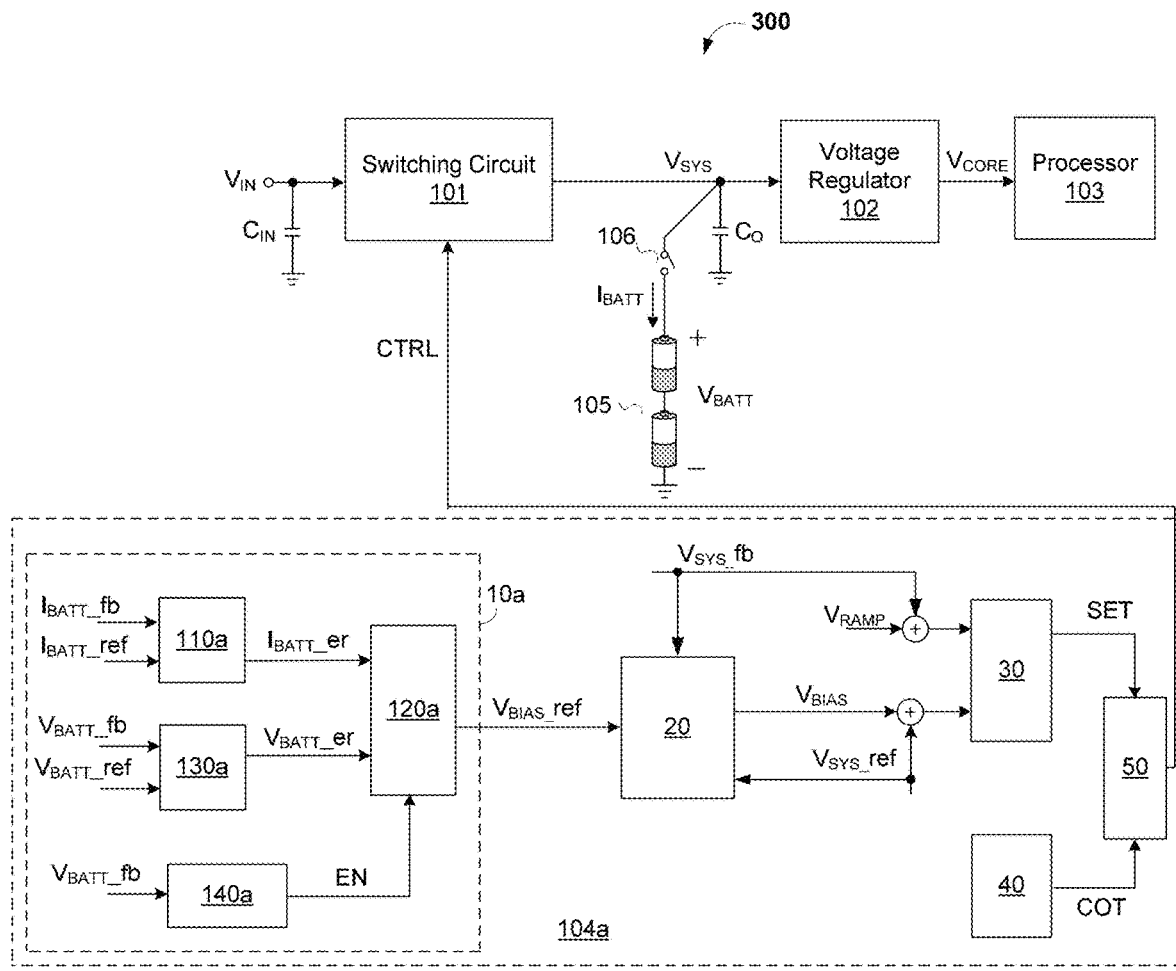
FIG. 4 shows a schematic diagram of an electronic device 300 in accordance with another embodiment of the present invention.

FIG. 4 shows a schematic diagram of an electronic device 300 in accordance with another embodiment of the present invention. The bias reference circuit 10a of FIG. 4 is different from the bias reference circuit 10 of FIG. 3 in that the bias reference circuit 10a further has a third input terminal and a fourth input terminal, wherein the third input terminal is configured to receive a battery voltage feedback signal $V_{BATT}$_fb, the fourth input terminal is configured to receive a battery voltage reference signal $V_{BATT}$_ref. In one embodiment, the battery voltage feedback signal $V_{BATT}$_ref is equal to the second threshold $V_{BATT\_REG}$. In another embodiment, the battery voltage reference signal $V_{BATT}$_ref is related to the second threshold $V_{BATT\_REG}$.

In the embodiment of FIG. 4, the bias reference circuit 10a comprises a first difference circuit 110a, a second difference circuit 130a, a proportional integrating circuit 120a and a mode control circuit 140a. The first difference circuit 110a is configured to receive the charging current feedback signal $I_{BATT}$_fb and the charging current reference signal $I_{BATT}$_ref, and provides the first difference signal $I_{BATT}$_er. The second difference circuit 130a is configured to receive the battery voltage feedback signal $V_{BATT}$_fb and the battery voltage reference signal $V_{BATT}$_ref and provides a second difference signal $V_{BATT}$_er.

In one embodiment, when the battery voltage $V_{BATT}$ is higher than the second threshold $V_{BATT\_REG}$, which represents the battery charging circuit is at the CV charge stage, the mode control circuit 140a provides the enable signal EN having a third level at an output terminal to enable the proportional integrating circuit 120a, and the proportional integrating circuit 120a is configured to proportionally integrate the second difference $V_{BATT}$_er and provides the bias reference signal $V_{BIAS}$_ref at the output terminal during the CV charge stage. In other words, during the CV charge stage, the bias reference circuit 10a is configured to provide the bias reference signal $V_{BIAS}$_ref based on the second difference signal $V_{BATT}$_er. During the CV charge stage the bias generator 20 is configured to provide the bias signal $V_{BIAS}$ based on the bias reference signal $V_{BIAS}$_ref to modulate the control signal CTRL to the switching circuit 101, regulating the battery voltage $V_{BATT}$ to maintain at the second threshold $V_{BATT\_REG}$.

Figure 5A:
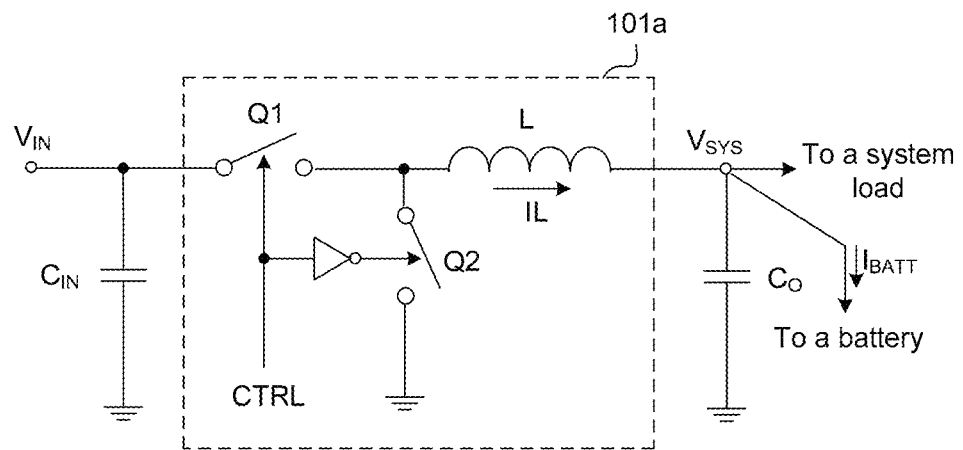
FIG. 5a schematically illustrates a switching circuit 101a in accordance with an embodiment of the present invention.

FIG. 5a schematically illustrates a switching circuit 101a in accordance with an embodiment of the present invention. The switching circuit 101a adopts a step-down (e.g. Buck) circuit as one example. The switching circuit 101a comprises a capacitor $C_{IN}$ coupled between the input terminal of the switching circuit 101a and a reference ground, a capacitor $C_O$ coupled between the output terminal of the switching circuit 101a and the reference ground, switches Q1 and Q2, and an inductor L. The switch Q1 has a first terminal coupled to the input terminal of the switching circuit 101a, and a second terminal. The switch Q2 has a first terminal coupled to the second terminal of the switch Q1, and a second terminal coupled to the reference ground. The inductor L has a first terminal coupled to the second terminal of switch Q1 and a first terminal of the switch Q2, and a second terminal coupled to the output terminal of the switching circuit 101a. The switches Q1 and Q2 are controlled by the control signal CTRL, and work complementarily. In one embodiment, the switch Q2 may be substituted by a diode.

Figure 5B:
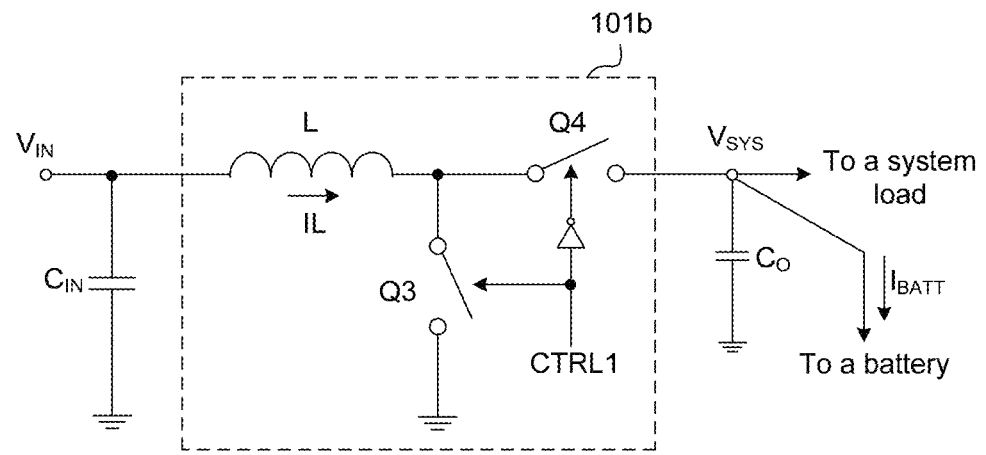
FIG. 5b schematically illustrates a switching circuit 101b in accordance with another embodiment of the present invention.

FIG. 5b schematically illustrates a switching circuit 101b in accordance with another embodiment of the present invention. The switching circuit 101b adopts a step-up (e.g. Boost) circuit as one example. The switching circuit 101b comprises a capacitor $C_{IN}$ coupled between the input terminal of the switching circuit 101b and the reference ground, a capacitor $C_O$ coupled between the output terminal of switching circuit 101b and the reference ground, switches Q3 and Q4, and an inductor L. The inductor L has a first terminal coupled to the input terminal of the switching circuit 101b, and a second terminal. The switch Q3 has a first terminal coupled to the second terminal of the inductor L, and a second terminal coupled to the reference ground. The switch Q4 has a first terminal coupled to the second terminal of inductor L and the first terminal of the switch Q3, and a second terminal coupled to the output terminal of switching circuit 101b. The switches Q3 and Q4 are controlled by a first control signal CTRL1 provided by the control circuit 104, and work complementarily. In one embodiment, the switch Q4 may be substituted by a diode.

Figure 5C:
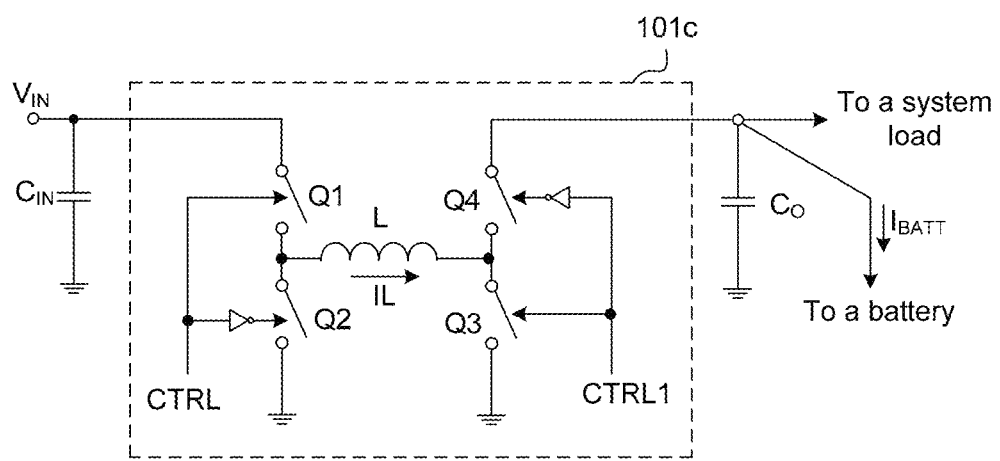
FIG. 5c schematically illustrates a switching circuit 101c in accordance with yet another embodiment of the present invention.

FIG. 5c schematically illustrates a switching circuit 101c in accordance with yet another embodiment of the present invention. The switching circuit 101c adopts a Buck-Boost circuit as one example. The switching circuit 101c comprises a capacitor $C_{IN}$ coupled between the input terminal of the switching circuit 101c and the reference ground, a capacitor $C_O$ coupled between the output terminal of the switching circuit 101c and the reference ground, switches Q1-Q4, and an inductor L. The switch Q1 has a first terminal coupled to the input terminal of the switching circuit 101c, and a second terminal. The switch Q2 has a first terminal coupled to the second terminal of the switch Q1, and a second terminal coupled to the reference ground. The switch Q3 has a first terminal coupled to the output terminal of the switching circuit 101c, and a second terminal. The switch Q4 has a first terminal coupled to the second terminal of the switch Q3, and a second terminal coupled to the reference ground. The Inductor L has a first terminal coupled to the second terminal of switch Q1 and the first terminal of the switch Q2, and a second terminal coupled to the second terminal of the switch Q3 and the first terminal of the switch Q4. The switches Q1 and Q2 are controlled by the control signal CTRL, and work complementarily. The switches Q3 and Q4 are controlled by the first control signal CTRL1 provided by the control circuit, and work complementarily. In one embodiment, the switch Q2 and/or switch Q4 may be substituted by a diode.

One of ordinary skill in the art should appreciate that specific circuit structure of switching circuit 101 is not limited as FIGS. 5a-5c shown, other circuits may be also used without detracting from merits of the present invention.

Figure 6:
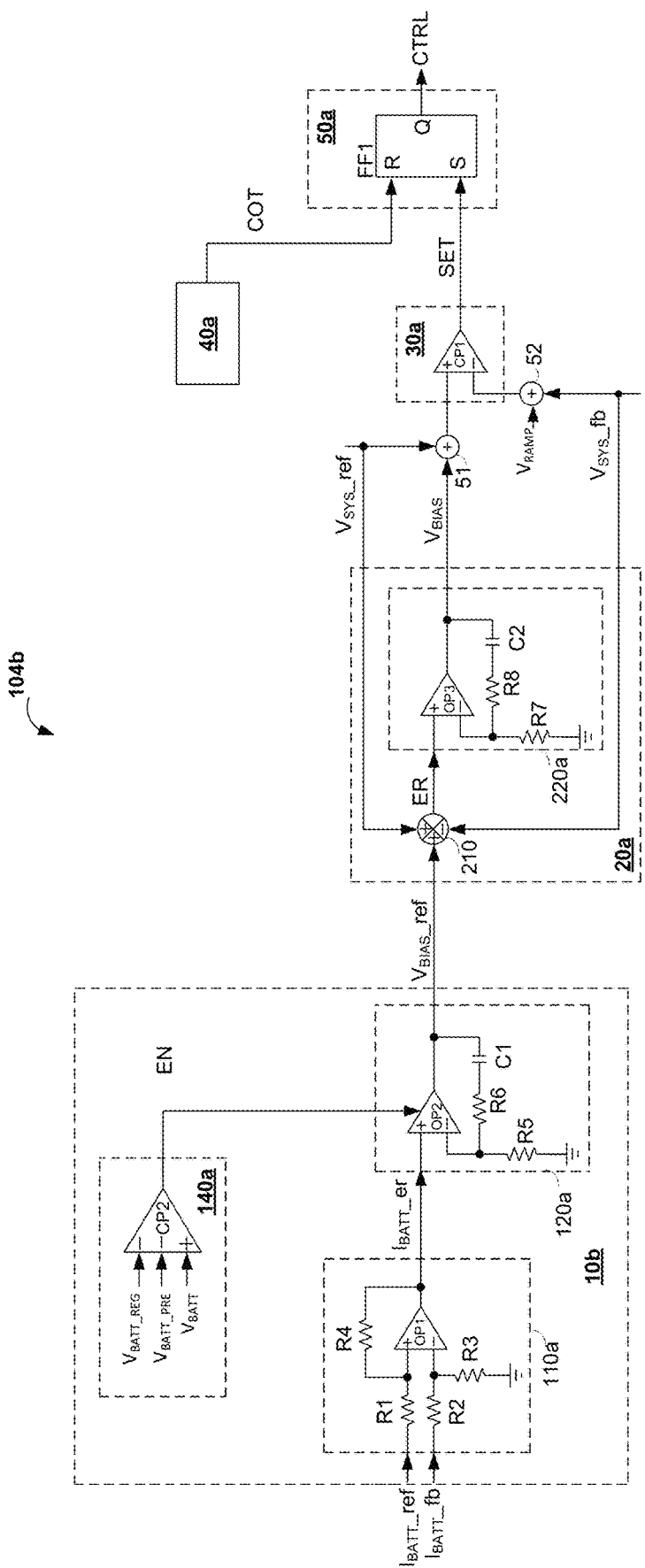
FIG. 6 shows a circuit diagram of a control circuit 104b in accordance with an embodiment of the present invention.

FIG. 6 shows a circuit diagram of a control circuit 104b in accordance with an embodiment of the present invention. In the embodiment of FIG. 6, the control circuit 104b comprises a bias reference circuit 10b, a bias generator 20a, a comparison circuit 30a, a constant time period control circuit 40a and a logic circuit 50a.

In the embodiment of FIG. 6, the bias reference circuit 10b comprises a first difference circuit 110a, a proportional integrating circuit 120a and a mode control circuit 140a. The first difference circuit 110a comprises a first subtracting circuit having an operational amplifier OP1 and resistors R1~R4. The first subtracting circuit has a first input terminal, a second input terminal and an output terminal, wherein the first input terminal is configured to receive the charging current feedback signal $I_{BATT}$-fb, the second input terminal is configured to receive the charging current reference signal $I_{BATT}$_ref, the first subtracting circuit provides the first difference signal $I_{BATT}$_er.

The mode control circuit 140a determines the charge stage of the battery charging circuit based on the battery voltage $V_{BATT}$. As shown in FIG. 6, the mode control circuit 140a comprises a comparator CP2, which receives the battery voltage $V_{BATT}$, the first threshold $V_{BATT\_PRE}$ and the second threshold $V_{BATT\_REG}$, and provides the enable signal EN at the output terminal. In detail, when the battery voltage $V_{BATT}$ is less than the first threshold $V_{BATT\_PRE}$, the enable signal EN has the first level, which represents the battery charging circuit is at the pre-charge stage. When the battery voltage $V_{BATT}$ is less than the second threshold $V_{BATT\_REG}$ and higher than the first threshold $V_{BATT}$_PRE, the enable signal EN has the second level, which represents the battery charging circuit is at the CC charge stage. When the battery voltage $V_{BATT}$ increases to the second threshold $V_{BATT\_REG}$, the enable signal EN has the third level, which represents the battery charging circuit is at the CV charge stage.

The proportional integrating circuit 120a comprises an operational amplifier OP2, resistors R5 and R6, and a capacitor C1. The proportional integrating circuit 120a receives the first difference signal $I_{BATT}$_er, when the enable signal EN has the second level, the proportional integrating circuit 120a proportionally integrates the first difference signal $I_{BATT}$_er and provides the bias reference signal $V_{BIAS}$_ref at the output terminal.

In the embodiment of FIG. 6, the bias generator 20a comprises an add-subtraction arithmetic circuit 210 and a proportional integrating circuit 220a. Wherein the add-subtraction arithmetic circuit 210 has a first input terminal, a second input terminal, a third input terminal and an output terminal, wherein the first input terminal is configured to receive the bias reference signal $V_{BIAS}$_ref, the second input terminal is configured to receive the system voltage reference signal $V_{SYS}$_ref, the third input terminal is configured to receive the system voltage feedback signal $V_{SYS}$_fb, the add-subtraction arithmetic circuit 210 subtracts the system voltage feedback signal $V_{SYS}$_fb from the sum of the bias reference signal $V_{BIAS}$_ref and the system voltage reference signal $V_{SYS}$_ref, and provides the error signal ER at the output terminal.

The proportional integrating circuit 220a comprises an operational amplifier OP3, resistors R7 and R8, and a capacitor C2. The proportional integrating circuit 220a receives the error signal ER and proportionally integrates the error signal ER, and provides a bias signal $V_{BIAS}$ at an output terminal. The proportional integrating circuit 220a shown in FIG. 6 is well known to persons of ordinary skill in the art, and will not be discussed here for brevity.

In the embodiment of FIG. 6, the control circuit 104b further comprises summing circuits 51 and 52. Wherein the summing circuit 51 has a first input terminal, a second input terminal and an output terminal, wherein the first input terminal is coupled to the output terminal of the bias generator 20a to receive the bias signal $V_{BIAS}$, the second input terminal is configured to receive a system voltage reference signal $V_{SYS}$_ref. The summing circuit 52 has a first input terminal, a second input terminal and an output terminal, wherein the first input terminal is configured to receive the system voltage feedback signal $V_{SYS}$_fb, the second input terminal is configured to receive the ramp signal $V_{RAMP}$. The comparison circuit 30a comprises a comparator CP1. The comparator CP1 has a non-inverting terminal, an inverting terminal and an output terminal, wherein the non-inverting terminal is coupled to the output terminal of the summing circuit 51 to receive the sum of the bias signal $V_{BIAS}$ and the system voltage reference signal $V_{SYS}$_ref, the inverting terminal is coupled to an output terminal of the summing circuit 52 to receive the sum of the system voltage feedback signal $V_{SYS}$_fb and the ramp signal $V_{RAMP}$, and provides a comparison signal SET at the output terminal.

The constant time period control circuit 40a provides the constant time period control signal COT at an output terminal. In one embodiment, the constant time period control signal COT is configured to control the ON-time of the switch Q1 of the switching circuit 101a shown in FIG. 5a. In another embodiment, the constant time period control signal COT is configured to control the ON-time of the switch Q1 of the switching circuit 101c shown in FIG. 5c. The logic circuit 50a comprises a RS flip-flop FF1. The RS flip-flop FF1 has a setting terminal, a resetting terminal and an output terminal, wherein the setting terminal is coupled to the output terminal of the comparison circuit 30a to receive the comparison signal SET, the resetting terminal is coupled to the output terminal of the constant time period control circuit 40a to receive the constant time period control signal COT. The RS flip-flop FF1 provides the control signal CTRL at the output terminal, based on the constant time period control signal COT and the comparison signal SET. In one embodiment, the control circuit 104b provides the control signal CTRL to control the switches Q1 and Q2 of the switching circuit 101a shown in FIG. 5a. In another embodiment, the control circuit 104b provides the control signal CTRL to control the switches Q1 and Q2 of the switching circuit 101c shown in FIG. 5c.

Figure 7:
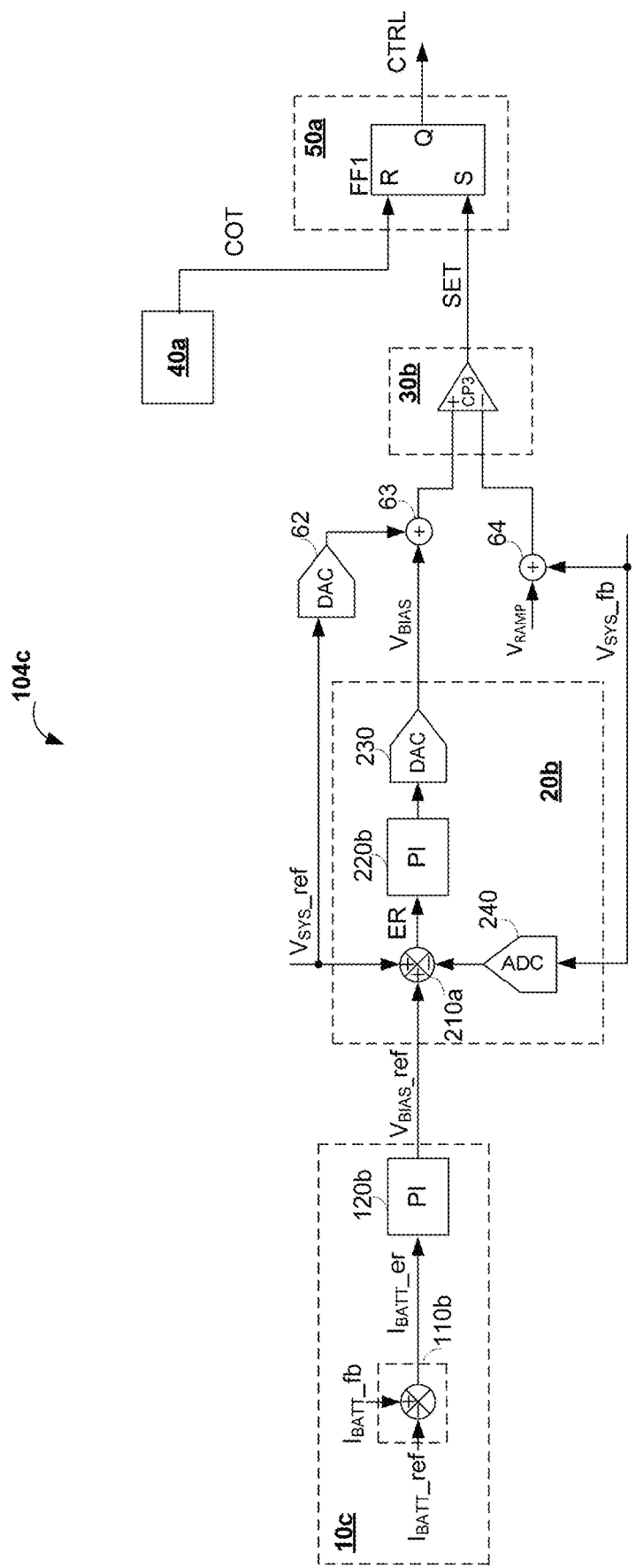
FIG. 7 shows a circuit diagram of a control circuit 104c in accordance with another embodiment of the present invention.

FIG. 7 shows a circuit diagram of a control circuit 104c in accordance with another embodiment of the present invention. In the embodiment of FIG. 7, the control circuit 104c comprises a bias reference circuit 10c, a bias generator 20b, a comparison circuit 30b, a constant time period control circuit 40a and a logic circuit 50a, wherein the bias reference circuit 10c and the bias generator 20b may be realized by digital circuits.

In the embodiment of FIG. 7, the bias reference circuit 110b comprises a subtractor 110b and the proportional integrator 120b. The subtractor 110b has a first input terminal, a second input terminal and an output terminal, wherein the first input terminal is configured to receive a digital charging current feedback signal $I_{BATT}\_fb$, the second input terminal is configured to receive a digital charging current reference signal $I_{BATT}\_ref$, the subtractor 110b subtracts the digital charging current reference signal $I_{BATT}\_ref$ from the digital charging current feedback signal $I_{BATT}\_fb$, and provides a digital difference signal $I_{BATT}\_er$ at the output terminal.

The proportional integrator 120b has an input terminal coupled to the output terminal of the subtractor 110b to receive the digital difference signal $I_{BATT}\_er$, when the battery voltage $V_{BATT}$ is less than a second threshold $V_{BATT\_REG}$ and higher than the first threshold $V_{BATT\_PRE}$, the proportional integrator 120b proportionally integrates the digital difference signal $I_{BATT}\_er$, and provides a digital bias reference signal $V_{BIAS}\_ref$ at an output terminal.

The bias generator 20b comprises an add-subtraction arithmetic circuit 210a, a proportional integrator 220b, an analog digital converter (ADC) 240 and a digital analog converter (DAC) 230. The ADC 240 has an input terminal coupled to receive the system voltage feedback signal $V_{SYS}\_fb$ and an output terminal configured to provide a digital system voltage feedback signal $V_{SYS}\_fb$. The add-subtraction arithmetic circuit 210a has a first input terminal, a second input terminal, a third input terminal and an output terminal, wherein the first input terminal is coupled to receive the digital bias reference signal $V_{BIAS}\_ref$, the second input terminal is coupled to receive the digital system voltage reference signal $V_{SYS}\_ref$, the third input terminal is coupled to the output terminal of the ADC 240 to receive the digital system voltage feedback signal $V_{SYS}\_fb$, the add-subtraction arithmetic circuit 210a subtracts the digital system voltage feedback signal $V_{SYS}\_fb$ from the sum of the digital bias reference signal $V_{BIAS}\_ref$ and the digital system voltage reference signal $V_{SYS}\_ref$. and provides a digital error signal ER. The proportional integrator 220b has an input terminal is coupled to the output terminal of the add-subtraction arithmetic circuit 210a to receive the digital error signal ER, proportionally integrates the digital error signal ER, and provides a digital bias signal $V_{BIAS}$ at an output Terminal. The DAC 230 has an input terminal coupled to the output terminal of the proportional integrator 220b to receive the digital bias signal $V_{BIAS}$, and provides an analog bias signal $V_{BIAS}$.

In the embodiment of FIG. 7, the control circuit 104c further comprises a DAC 62, summing circuits 63 and 64. The DAC 62 has an input terminal configured to receive the digital system voltage reference signal $V_{SYS}\_ref$ and provides an analog system voltage reference signal $V_{SYS}\_ref$. In one embodiment, the resolution of the DAC 230 is higher than the resolution of the DAC 62.

The summing circuit 62 has a first input terminal, a second input terminal and an output terminal, wherein the first input terminal is coupled to the output terminal of the bias generator 20b to receive the bias signal $V_{BIAS}$, the second input terminal is coupled to the output terminal of the DAC 62 to receive the system voltage reference signal $V_{SYS}\_ref$. The summing circuit 64 has a first input terminal, a second input terminal and an output terminal, wherein the first input terminal is coupled to receive the system voltage feedback signal $V_{SYS}\_fb$, the second input terminal is coupled to receive the ramp signal $V_{RAMP}$. The comparison circuit 30b comprises a comparator CP3. The comparator CP3 has a non-inverting terminal, an inverting terminal and an output terminal, wherein the non-inverting terminal is coupled to the output terminal of the summing circuit 63 to receive the sum of the bias signal $V_{BIAS}$ and the system voltage reference signal $V_{SYS}\_ref$, the inverting terminal is coupled to the output terminal of the summing circuit 64 to receive the system voltage feedback signal $V_{SYS}\_fb$ and the ramp signal $V_{RAMP}$, the comparator CP3 provides the comparison signal SET.

Figure 8:
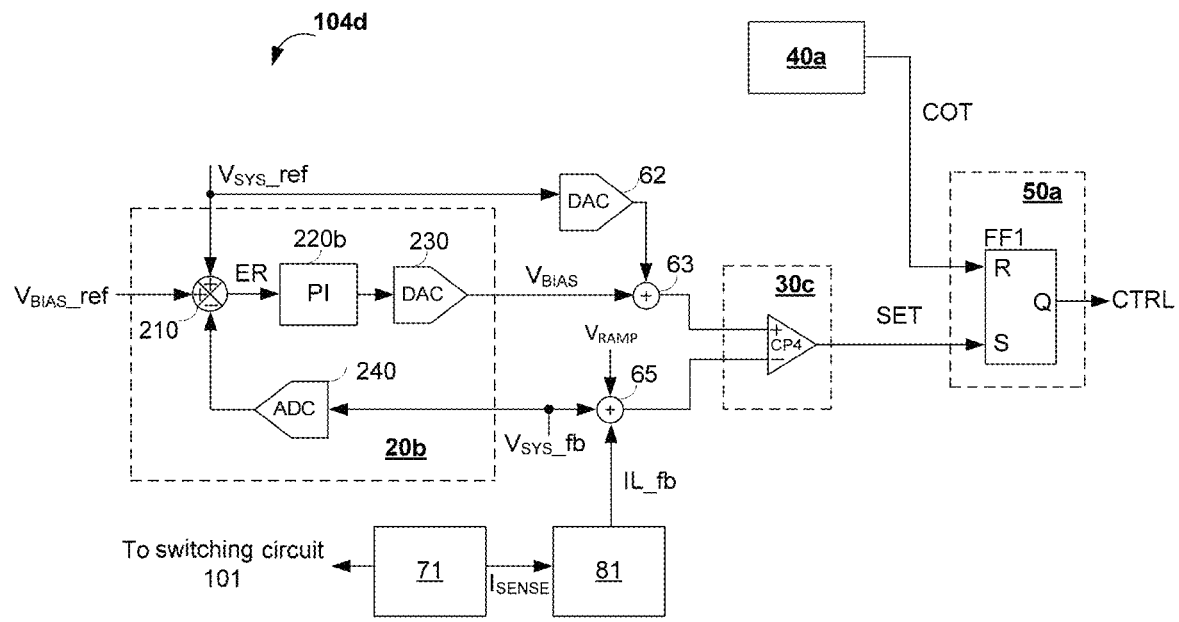
FIG. 8 shows a circuit diagram of a control circuit 104d in accordance with another embodiment of the present invention.

FIG. 8 shows a circuit diagram of a control circuit 104d in accordance with another embodiment of the present invention. In the embodiment of FIG. 8, the switching circuit 101 comprises at least one switch and an inductor L coupled to the at least one switch. The control circuit 104d introduces a current feedback signal IL_fb representative of the inductor current of the switching circuit 101, typically, IL_fb=k*$I_{SENSE}$, wherein k is proportional constant. In this way, a loop zero is added to the system voltage control loop to improve the system stability.

The control circuit 104d comprises a bias reference circuit 10c (as shown in FIG. 7), the bias generator 20b, the DAC 62, the summing circuit 63, a current sensing circuit 71, the proportional amplifying circuit 81, the summing circuit 65, a comparison circuit 30c, a constant time period control circuit 40a and a logic circuit 50a. The current sensing circuit 71 is configured to sense the current flowing through the inductor L and provides a current sensing signal $I_{SENSE}$. The said sensing above can be realized by a sensing resistor, a current transformer or a current mirror, or may be realized by the sampling the current flowing through the transistor Q2 shown in FIG. 5a to estimate the inductor current and generates the current sensing signal $I_{SENSE}$. The proportional amplifying circuit 81 has an input terminal coupled to the output terminal of the current sensing circuit 71 and provides a current feedback signal IL_fb proportional to the current sensing signal $I_{SENSE}$. In one embodiment, the proportional amplifying circuit 81 can be omitted. The summing circuit 65 has a first input terminal, a second input terminal, a third input terminal and output terminal, wherein the first input terminal is coupled to receive the system voltage feedback signal $V_{SYS}\_fb$, the second input terminal is coupled to receive the ramp signal $V_{RAMP}$, the third input terminal is coupled to the current feedback signal IL_fb.

The comparison circuit 30c comprises a comparator CP4. The comparator CP4 has a non-inverting terminal, an inverting terminal and an output terminal, wherein the non-inverting terminal is coupled to the output terminal of the summing circuit 63 to receive the sum of the bias signal $V_{BIAS}$ and the system voltage reference signal $V_{SYS}\_ref$, the inverting terminal is coupled to the output terminal of the summing circuit 65 to receive the sum of the system voltage feedback signal $V_{SYS}\_fb$, the ramp signal $V_{RAMP}$ and the current feedback signal IL_fb, and provides the comparison signal SET at the output terminal.

Figure 9:
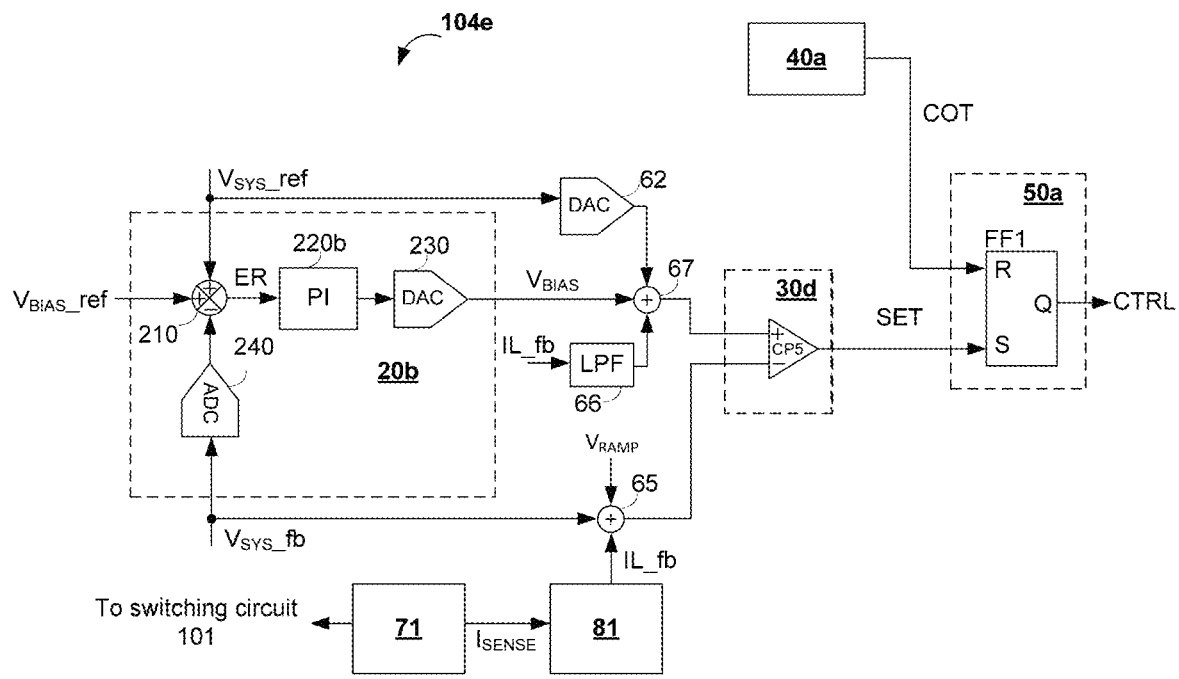
FIG. 9 shows a circuit diagram of a control circuit 104e in accordance with another embodiment of the present invention.

FIG. 9 shows a circuit diagram of a control circuit 104e in accordance with another embodiment of the present invention. To improve the performance of the system fast transient response, the summing circuit 63 shown in FIG. 8 is replaced with the summing circuit 67 shown in FIG. 9, and a low-pass filter 66 is further included. The low-pass filter 66 has an input terminal and an output terminal, wherein the input terminal is coupled to receive the current feedback signal IL_fb, the low-pass filter 66 provides an average current signal IL_avg. The average current signal IL_avg is configured to represent the DC component of the current feedback signal IL_fb. In one embodiment, the filter constant of the low-pass filter 66 is higher than the switching cycle of the switching circuit 101. The summing circuit 67 has a first input terminal, a second input terminal, a third input terminal and an output terminal, wherein the first input terminal is coupled to receive the system voltage reference signal $V_{SYS}$_ref, the second input terminal is coupled to the bias signal $V_{BIAS}$, the third input terminal is coupled to the output terminal of the low-pass filter 66 to receive the average current signal IL_avg. The comparison circuit 30d comprises a comparator CP5. The comparator CP5 has a non-inverting terminal, an inverting terminal and an output terminal, wherein the non-inverting terminal is coupled to the output terminal of the summing circuit 67 to receive the sum of the bias signal $V_{BIAS}$, the system voltage reference signal $V_{SYS}$_ref and the average current signal IL_avg, the inverting terminal is coupled to the output terminal of the summing circuit 65 to receive the sum of the system voltage feedback signal $V_{SYS}$_fb, the ramp signal $V_{RAMP}$ and the current feedback signal IL_fb. The comparator CP5 provides the comparison signal SET at the output terminal. In the embodiment of FIG. 9, the average current signal IL_avg is configured to cancel the DC component of the current feedback signal IL_fb and to keep the AC component of the current feedback signal IL_fb. According the embodiment of FIG. 9, fast transient response can be provided and the system performance is improved.

One with ordinary skill in the art should appreciate that specific circuit structure of control circuit is not limited as FIGS. 3-9 shown. For example, signals that the inverting terminal and the non-inverting terminal of the comparator of the comparison circuit received may be interchanged to realize a same function with inversed logic level.

Figure 10:
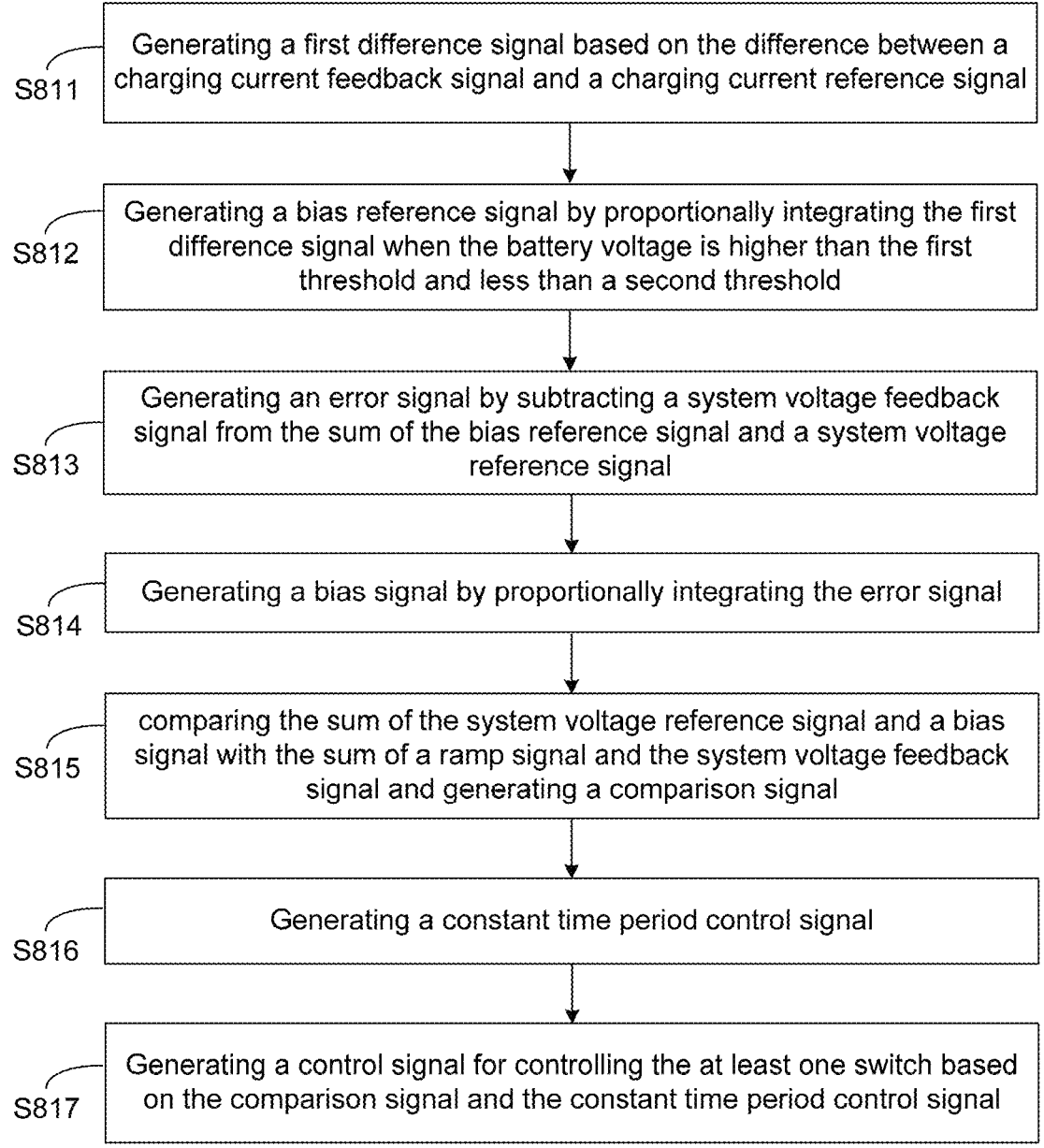
FIG. 10 shows a work flow of a control method 800 for controlling a battery charging circuit in accordance with an embodiment of the present invention.

FIG. 10 shows a work flow of a control method 800 for controlling a battery charging circuit in accordance with an embodiment of the present invention. The battery charging circuit comprises a switching circuit having at least one switch and an inductor coupled to the at least one switch, the switching circuit provides a system voltage to a system load and charges an associated battery, the control method comprises steps S811~S817.

At step S811, based on the difference between a charging current feedback signal and a charging current reference signal, a first difference signal is generated.

At step S812, a bias reference signal is generated by proportionally integrating the first difference signal when the battery voltage is higher than a first threshold and less than a second threshold, wherein the first threshold is less than the second threshold.

At step S813, a system voltage feedback signal is subtracted from the sum of the bias reference signal and a system voltage reference signal, and an error signal is generated.

At step S814, a bias signal is generated by proportionally integrating the error signal.

At step S815, a comparison signal is generated by comparing the sum of the system voltage feedback signal and a ramp signal with the sum of the bias signal and the system voltage reference signal.

At step S816, a constant time period control signal is generated.

At step S817, a control signal is generated to control the at least one switch of a switching circuit based on the comparison signal and the constant time period control signal.

In one embodiment, the step S812 further comprises: based on the difference between a battery voltage feedback signal and a battery voltage reference signal, a second difference signal is generated; and the bias reference signal is generated by proportionally integrating the second difference signal when the battery voltage is higher than the second threshold.

In one embodiment, when the battery voltage is less than the first threshold, the error signal is equal to the difference between the system voltage reference signal and the system voltage feedback signal.

In one embodiment, the method 800 further comprises: a current feedback signal is generated by sensing an inductor current of the switching circuit, an average current signal is generated by filtering the current feedback signal, and the comparison signal is generated by comparing the sum of the bias signal, the average current signal and the system voltage reference signal with the sum of the system voltage feedback signal, the ramp signal and the current feedback signal.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit used in a battery charging circuit having at least one switch and an inductor coupled to the at least one switch, the control circuit comprising:
   a bias reference circuit having a first input terminal configured to receive a charging current feedback signal and a second input terminal configured to receive a charging current reference signal, wherein the bias reference circuit proportionally integrates a difference between the charging current feedback signal and the charging current reference signal and provides a bias reference signal at an output terminal when a battery voltage is higher than a first threshold and less than a second threshold;

a bias generator coupled to the output terminal of the bias reference circuit to receive the bias reference signal, wherein the bias generator proportionally integrates a difference between the sum of the bias reference signal and a system voltage reference signal and a system voltage feedback signal, and provides a bias signal at an output terminal;

a comparison circuit having a first input terminal, a second input terminal and an output terminal, wherein the first input terminal is configured to receive the sum of the bias signal and the system voltage reference signal, and the second input terminal is configured to receive the sum of the system voltage feedback signal and a ramp signal, the comparison circuit provides a comparison signal at the output terminal;

a constant time period control circuit configured to provide a constant time period control signal; and a logic circuit configured to receive the comparison signal and the constant time period control signal, wherein the logic circuit provides a control signal at an output terminal to control the at least one switch.

2. The control circuit of claim 1, wherein the bias reference circuit further comprises:

a first difference circuit configured to receive the charging current feedback signal and the charging current reference signal and to provide a first difference signal;

a first proportional integrating circuit coupled to the first difference circuit to receive the first difference signal, wherein the first proportional integrating circuit proportionally integrates the first difference signal and provides the bias reference signal when the battery voltage is higher than the first threshold and less than the second threshold;

and wherein the bias generator further comprises:

an add-subtraction arithmetic circuit having a first input terminal configured to receive the bias reference signal, a second input terminal configured to receive the system voltage reference signal, a third input terminal configured to receive the system voltage feedback signal, wherein the add-subtraction arithmetic circuit subtracts the system voltage feedback signal from the sum of the bias reference signal and the system voltage reference signal, and provides an error signal; and a second proportional integrating circuit coupled to the add-subtraction arithmetic circuit to receive the error signal, wherein the second proportional integrating circuit proportionally integrates the error signal and provides the bias signal.

3. The control circuit of claim 2, wherein the error signal is equal to the difference between the system voltage reference signal and the system voltage feedback signal.

4. The control circuit of claim 1, wherein the bias reference circuit further having a third input terminal and a fourth input terminal, wherein the third input terminal is configured to receive a battery voltage feedback signal, the fourth input terminal is configured to a battery voltage reference signal, the bias reference circuit proportionally integrates a difference between the battery voltage feedback signal and the battery voltage reference signal, and provides the bias reference signal at the output terminal when the battery voltage is higher than the second threshold.

5. The control circuit of claim 1, wherein the first input terminal of the comparison circuit is configured to receive the sum of the bias signal and the system voltage reference signal, the second input terminal of the comparison circuit is configured to receive the sum of the system voltage feedback signal, the ramp signal and a current feedback signal representative of a current flowing through the inductor, and wherein the comparison circuit provides the comparison signal at the output terminal.

6. The control circuit of claim 5, further comprising:

a low-pass filter configured to receive the current feedback signal, wherein the low-pass filter filters the current feedback signal and provides an average current signal; and wherein the first input terminal of the comparison circuit is configured to receive the sum of the bias signal, the system voltage reference signal and the average current signal, the second input terminal of the comparison circuit is configured to receive the sum of the system voltage feedback signal, the ramp signal and the current feedback signal, and wherein the comparison circuit provides the comparison signal at the output terminal.

7. The control circuit of claim 5, further comprising:

a first digital analog converter configured to receive a digital system voltage reference signal, and wherein the first digital analog converter provides a system voltage reference signal to the first input terminal of the comparison circuit; and a second digital analog converter configured to receive a digital bias signal, and wherein the second digital analog converter provides the bias signal to the first input terminal of the comparison circuit, and wherein the resolution of the first digital analog converter is higher than the resolution of the second digital analog converter.

8. A battery charging circuit, comprising:

a switching circuit having at least one switch and an inductor coupled to the at least one switch;

a bias reference circuit having a first input terminal configured to receive a charging current feedback signal and a second input terminal configured to receive a charging current reference signal, wherein the bias reference circuit proportionally integrates a difference between the charging current feedback signal and the charging current reference signal and provides a bias reference signal at an output terminal when a battery voltage is higher than a first threshold and less than a second threshold, wherein the first threshold is less than the second threshold;

a bias generator coupled to the output terminal of the bias reference circuit to receive the bias reference signal, wherein the bias generator proportionally integrates a difference between the sum of the bias reference signal and a system voltage reference signal and a system voltage feedback signal, and provides a bias signal at an output terminal;

a comparison circuit having a first input terminal, a second input terminal and an output terminal, wherein the first input terminal is configured to receive the sum of the bias signal and the system voltage reference signal, and the second input terminal is configured to receive the sum of the system voltage feedback signal and a ramp signal, the comparison circuit provides a comparison signal at the output terminal;

a constant time period control circuit configured to provide a constant time period control signal; and a logic circuit configured to receive the comparison signal and the constant time period control signal, wherein the logic circuit provides a control signal at an output terminal to control the at least one switch.

9. The battery charging circuit of claim 8, wherein:
the bias reference circuit further comprising:
a first difference circuit configured to receive the charging current feedback signal and the charging current reference signal and to provide a first difference signal;
a first proportional integrating circuit coupled to the first difference circuit to receive the first difference signal, wherein the first proportional integrating circuit proportionally integrates the first difference signal and provides the bias reference signal when the battery voltage is higher than the first threshold and less than the second threshold;
the bias generator comprises:
an add-subtraction arithmetic circuit having a first input terminal configured to receive the bias reference signal, a second input terminal configured to receive the system voltage reference signal, a third input terminal configured to receive the system voltage feedback signal, wherein the add-subtraction arithmetic circuit subtracts the system voltage feedback signal from the sum of the bias reference signal and the system voltage reference signal, and provides an error signal; and
a second proportional integrating circuit coupled to the add-subtraction arithmetic circuit to receive the error signal, wherein the second proportional integrating circuit proportionally integrates the error signal and provides the bias signal.

10. The battery charging circuit of claim 9, wherein the error signal is equal to the difference between the system voltage reference signal and the system voltage feedback signal.

11. The battery charging circuit of claim 8, wherein the bias reference circuit further having a third input terminal and a fourth input terminal, wherein the third input terminal is configured to receive a battery voltage feedback signal, the fourth input terminal is configured to a battery voltage reference signal, the bias reference circuit proportionally integrates a difference between the battery voltage feedback signal and the battery voltage reference signal, and provides the bias reference signal at the output terminal when the battery voltage is higher than the second threshold.

12. The battery charging circuit of claim 8, wherein the first input terminal of the comparison circuit is configured to receive the sum of the bias signal and the system voltage reference signal, the second input terminal of the comparison circuit is configured to receive the sum of the system voltage feedback signal, the ramp signal and a current feedback signal representative of a current flowing through the inductor, and wherein the comparison circuit provides the comparison signal at the output terminal.

13. The battery charging circuit of claim 12, further comprising:
a low-pass filter configured to receive the current feedback signal, wherein the low-pass filter filters the current feedback signal and provides an average current signal; and
wherein the first input terminal of the comparison circuit is configured to receive the sum of the bias signal, the system voltage reference signal and the average current signal, the second input terminal of the comparison circuit is configured to receive the sum of the system voltage feedback signal, the ramp signal and the current feedback signal, and wherein the comparison circuit provides the comparison signal at the output terminal.

14. The battery charging circuit of claim 12, further comprising:
a first digital analog converter configured to receive a digital system voltage reference signal, and wherein the first digital analog converter provides a system voltage reference signal to the first input terminal of the comparison circuit; and
a second digital analog converter configured to receive a digital bias signal, and wherein the second digital analog converter provides the bias signal to the first input terminal of the comparison circuit, and wherein the resolution of the first digital analog converter is higher than the resolution of the second digital analog converter.

15. A control method for controlling a battery charging circuit having at least one switch and an inductor coupled to the at least one switch, the control method comprising:
generating a first difference signal based on the difference between a charging current feedback signal and a charging current reference signal;
generating a bias reference signal by proportionally integrating the first difference signal when the battery voltage is higher than a first threshold and less than a second threshold, wherein the first threshold is less than the second threshold;
generating an error signal by subtracting a system voltage feedback signal from the sum of the bias reference signal and a system voltage reference signal;
generating a bias signal by proportionally integrating the error signal;
comparing the sum of a system voltage feedback signal and a ramp signal with the sum of the bias signal and a system voltage reference signal and generating a comparison signal;
generating a constant time period control signal; and
generating a control signal for controlling the at least one switch based on the comparison signal and the constant time period control signal.

16. The control method of claim 15, wherein generating the bias reference signal further comprises:
generating a second difference signal based on the difference between a battery voltage feedback signal and a battery voltage reference signal; and
generating the bias reference signal by proportionally integrating the second difference signal when the battery voltage is higher than the second threshold.

17. The control method of claim 15, wherein the error signal is equal to the difference between the system voltage reference signal and the system voltage feedback signal.

18. The control method of claim 15, further comprises:
generating a current feedback signal representative of a current flowing through the inductor;
generating an average current signal by filtering the current feedback signal; and
generating the comparison signal by comparing the sum of the bias signal, the average current signal and the system voltage reference signal with the sum of the system voltage feedback signal, the ramp signal and the current feedback signal.

* * * * *